United States Patent [19]

Bech et al.

[11] Patent Number: 5,773,952
[45] Date of Patent: Jun. 30, 1998

[54] SELF CORRECTING ARRANGEMENT FOR SELF COMPENSATION OF AN OPERATING POSITION SERVO

[75] Inventors: Mogens Ilsted Bech, Birkerød; Gert Steen Rønne, Kokkedal, both of Denmark

[73] Assignee: Gemo 1991 ApS, Hørsholm, Denmark

[21] Appl. No.: 635,657

[22] Filed: Apr. 22, 1996

[51] Int. Cl.[6] .................................................. G05D 23/275
[52] U.S. Cl. ...................... 318/632; 318/560; 318/568.18
[58] Field of Search ................................... 318/632, 560, 318/568.18

[56] References Cited

U.S. PATENT DOCUMENTS 4,194,184  3/1980  Hartmann et al. ................... 318/560 X
5,561,242  10/1996  Naumann et al. ................... 318/560 X

*Primary Examiner*—Karen Masih
*Attorney, Agent, or Firm*—Sixbey, Friedman, Leedom & Ferguson; David S. Safran

[57] ABSTRACT

A device for providing self compensation of an operating position servo, as when external forces influence movement of a movable object, for example, when turning a wheel chair seat, has a position encoder for outputting position signal sets and for turning of the movable object, servo circuitry with elements for simultaneously signal handling at least two sets of controlling position signals, each set having at least two positioning signals. The servo circuitry includes a coupling device having at least two coupling members which are switchable between a first position which passes a respective one of the at least two velocity dependent signal components of the second set of controlling positioning signals to circuitry producing a drive powering signal and a second position at least temporarily substituting a corresponding one of the at least two velocity dependent signal components of the second set of controlling position signals with a respective one of the at least two position signal components of the first set of controlling positioning signals and through this said second position of the coupling members to produce self compensation by at least temporarily producing a self-corrected value of the at least two velocity dependent signal components of the second set of controlling positioning signals, and causing the self-corrected value to be accepted as a new initial drive powering signal which is maintained as the drive powering signal by the servo when the coupling members are switched back and attain said first switching position.

13 Claims, 2 Drawing Sheets

SELF CORRECTING ARRANGEMENT FOR SELF COMPENSATION OF AN OPERATING POSITION SERVO

BACKGROUND OF THE INVENTION

1. Field of the Invention

The present invention relates to a self correcting arrangement for self compensation of an operating position servo, such as providing of self compensation whenever the object being controlled by the position servo is being subject to the positioning disturbing external influences, in power-up situations and respectively whenever forceful external influences overpower the positioning operation provided by the servo, respectively when the controlled object exerts a strong inertial load to the servo, which possible conditions in particular are occurring when employing a position servo for turning of a wheel chair seat. The self correcting device described herethrough relates to a positioning servo being of the kind with a servo circuitry comprising elements for handling at least two sets of controlling position signals with each set comprising at least two positioning signals, whereby a. one of these sets of controlling position signals thus comprises at least two signal components for handling at least 2-dimensional positioning of the movable object which is being controlled through the servo, and whereby b. another of these sets of controlling signals thus comprises at least two signal components which are for the controlled movable object hereto corresponding, the aimed position of the object, if reached with the aimed velocity of moving, locating and thus of the aimed size of velocity dependent signal components.

2. Description of Related Art

In the case of position servos employed for turning of wheel chair seats, the inertial load presented to the servo is extremely variable, varying from the load presented by an empty seat to the case with a heavy person being seated in the seat, whereto comes that external forces are exerted on the seat while casual driving against hindrances, such as door frames, furniture, walls, beds, etc., or if a helper wants to counterturn the seat to avoid the hitting of neighbouring objects, etc. Also while driving over hindrances on a floor the provision of a device for self correcting or self compensating of the servo in a great many situations must be regarded as advantageous.

Such a self correcting or self compensating device is also advantageous to utilize during power-up of the servo, because the self correcting or self compensating feature makes the providing of a special initial directing of the controlled object unnecessary when powering-up.

In WO 93/20791 belonging to the present applicants, a position servo mechanism for a wheel chair, and in particular wheel chairs with rotary supported seats is described. The described servo mechanism also relates to such a wheel chair seat by which the turning of the seat is activated by activating of a separate turning knob.

SUMMARY OF THE INVENTION

The self correcting device according to the present invention can be employed as an additional unitary device being inserted as a serial element in by way of example the abovementioned servo mechanism of prior art.

On the other hand the self correcting device may also be employed as a unit in servo mechanisms controlling other kinds of objects than just rotary seats.

It is thus, according to the present invention, contemplated that such a self correcting device either remains coupled into the servo circuitry or the device is only coupled into operational condition during the powering-up phase of the servo or it is more or less automatically coupled into the servo circuitry only when an overload condition occurs which could be detected by employing an additional current monitoring stage which monitors the drive current supplied to the drive means for the controlled object and couples the self correcting device into operational condition whenever monitored operational limits indicating overload are exceeded. Such operational limits can furthermore be made able to be selected in size so that conditions for activating the self correcting device can be selected.

An embodiment according to the invention being able to be employed in relation to a turning mechanism for a seat which is held rotary supported in a wheel chair is, by way of example, described in more details as follows under reference to the drawings.

Figure 1:
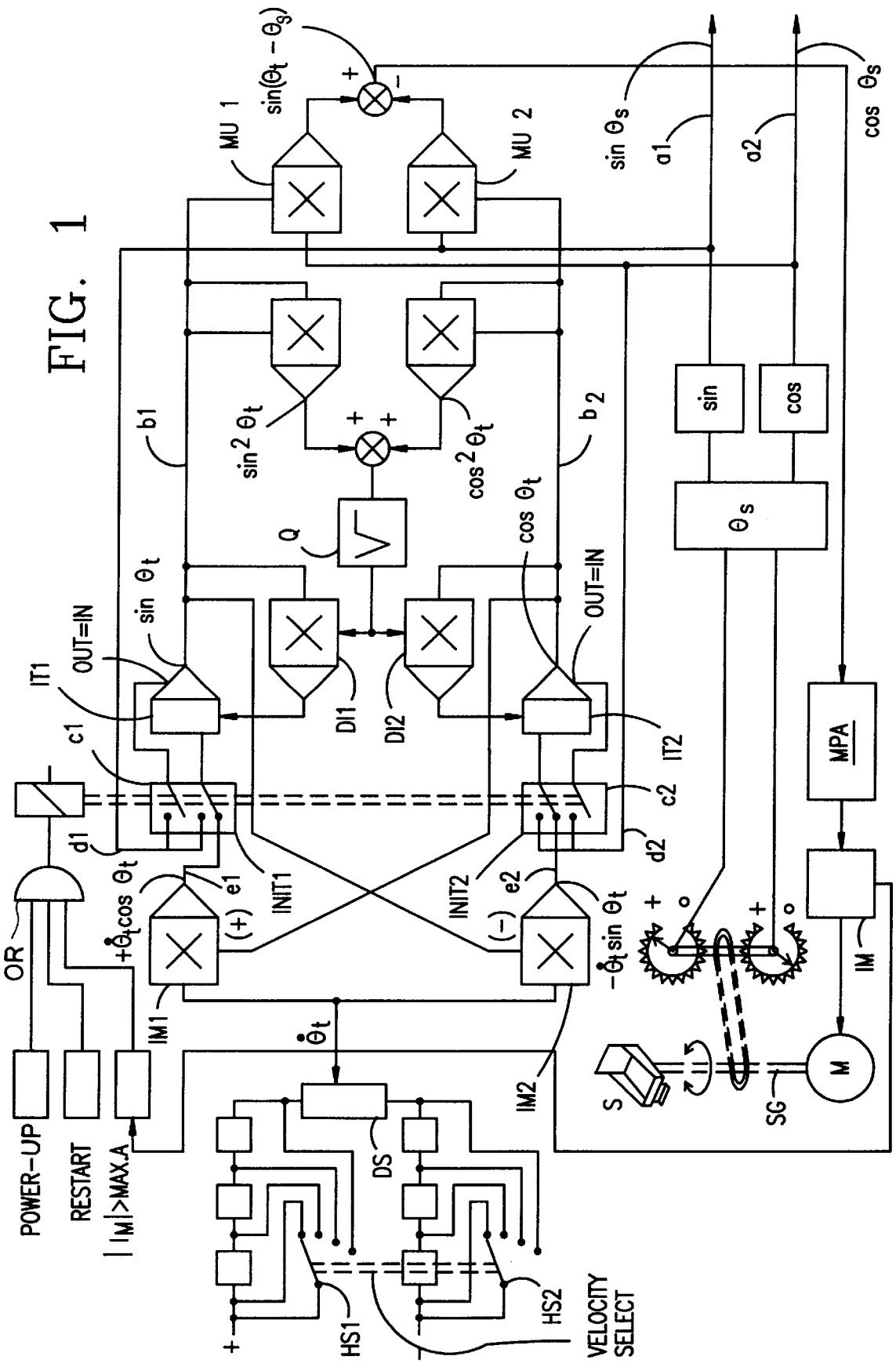
FIG. 1 schematically illustrates the principle structure of a position servo being embodied according to the invention and by way of example being arranged for turning a rotary supported seat of a wheel chair.

Elements shown in the drawing which serve the same or serve a corresponding function are indicated through the same sign of reference.

DETAILED DESCRIPTION OF THE PREFERRED EMBODIMENTS

A wheel chair seat S is rotary supported on a seat shaft which is driven through a suitable gear SG from a drive means M which is controlled by a position servo mechanism making the seat capable of being turned 360° an unlimited number of times by turning the rotary supported seat shaft. This seat shaft is, for instance mechanically, connected to an angle encoder encoding the turning angle of the seat, i.e. encoding the position angle $\theta_s$ of the seat, thereby providing a set of signals to be regarded as, for instance, a set comprising two separate controlling signal components a1, a2, whereby the choice of two being in particular the case when the servo is performing a 2-dimensional positioning, as it is the case here when controlling the turning of a wheel chair seat. In the present case, the set of signal components may most simply, by way of example, be made up of two conjugated signals which relationally are represented as, respectively, $\sin \theta_s$ and $\cos \theta_s$. In practice, the signal components will have to exhibit suitable voltage or current amplitudes corresponding to the individual circuit elements in the circuit employed. For reasons of clarity of explanation, substantially all the various servo signals or signal components comprised within the circuit and to be described using such simple designations as "sin" and "cos" to characterize the signals or the signal components, thus omitting any "local" element dependent amplitudes whenever possible.

By way of example, an embodiment of an angle encoder for the seat angle $\theta_s$ is shown in FIG. 1. Mechanically, the seat shaft is shown to provide simultaneous rotation through an angle of 180° of two mutually displaced, rotary potentiometer arms. These arms are shown as being comprised within two circularly shaped individual potentiometers which are being supplied with equally polarized DC supply voltages, so that, at any moment, as illustrated schematically with block $\theta_s$, two DC-voltages through further sin and cos providing blocks are transformed to exhibit a set of two conjugated signals to be regarded as separate signal components a1 and a2, thus representing the positional turning angle of the seat S through the added synchronous emblematic references sin $\theta_s$ and cos $\theta_s$ of these two conjugated signals. These two signals are connected to two multiplying stages MU1 and MU2 and also to two coupling devices c1 and c2 which are described in more details as follows.

To these two multiplying stages MU1 and MU2 are also supplied two other signals b1 and b2 which signals, which are described in further details later, serve to indicate the position which it is the aim to attain with an aimed velocity of rotation of the seat S. The output signals from these two multiplying stages MU1 and MU2 are mutually subtracted, and the resulting signal sin $(\theta_s - \theta_s)$ is connected to a device MPA providing suitable power amplifying and drive power drive means M. The output signal from the device MPA is, for example, connected to the drive means M for turning of the seat S by a drive power monitoring stage IM.

The abovementioned signals b1 and b2 are, for example, referred to, respectively, as sin $\theta_r$ and cos $\theta_r$ and also, by way of example, they may be generated as follows.

The seat S of the wheel chair may be activated to rotate by means of a turning knob DS which can be of the kind by which the rotary deflection of the knob DS, being deflectable to one side or the other, determines the size of the turning velocity of the seat. As a safety measure against thereby attaining too large of a turning velocity of the seat, a further selecting key device HS1, HS2 may be provided. By means of this further selecting key device, the maximum turning velocity of the seat which is attainable through maximum deflection of the turning knob DS can be separately selected. It is easily contemplated that other combinations of controlling knobs for the turning of the seat easily can be employed, nevertheless, from an operational point of view, such combinations in operation, in general, can be contemplated in somehow sufficient measure approximately to be thus reducible in structure that they are explainable through the illustrated embodiment.

At the left hand side of FIG. 1, by way of example, switches HS1, HS2 are shown which enable four turning velocities of the seat to be selected, and thus, serve to voltage supply a turning knob potentiometer DS with four selectable supply voltages. The turning knob potentiometer DS is, by means of an unillustrated spring means, mechanically maintained in a mid-position whenever inactivated. When occupying the mid-position, the output signal voltage from the turning knob potentiometer DS is zero, and when deflected for activation to one side or the other, depending on the size of the deflection, a corresponding positive or negative signal voltage $\theta_r$ is generated. The generated output voltage thus just corresponds effectively to the aimed velocity.

This output signal voltage is, by a circuitry as shown, transformed into two signals which, when the position being aimed at is attained through the course of the aimed size of velocity, indicate the aimed position and are designated as b1="sin" and b2="cos". Thus, these signals, to be regarded as signal components, are valid for the position whenever it is attainable through a course of movement given at the single moments of the course of movement through signal $\theta_r$, and which signal thus, with the selected embodiment of it, could exist in shape of a varying signal presented as a compound comprising a sequence of large or small activating deflections, such as are generated by sequentially making (different) turning deflections of the activating turning knob DS.

The circuitry should be easy to understand. Through the reference signs (+) and (−) arranged at the first multiplying stages IM1 and IM2, it is indicated that the single signals have to be connected to either the "+" or the "−" input of the stages. In the illustrated embodiment, it is also the intention that the amplification produced by means of the individual corresponding stages in the course of the paths through the circuitry, causes the respective signals or signal components b1 and b2 to be relatively, at least substantially, of similar size. Through the course of the paths through the circuitry, after the multiplying stages IM1 and IM2, follow change-over stages INIT1 and INIT2, also referred to by c1 and c2, whereby, substituting, a self correcting signal or, what should be the same, a self compensating signal can be coupled into the circuitry as to be described in more details as follows, and then are integrating stages IT1 and IT2 which receive from stages of dividing DI1 and D2, generally as symbolically indicated in the drawing though multiplying, a common signal with such a size that the relative signal value is "1", being acquired as the sum of the square of the sin and cos signals $\sin^2 \theta_r$, og $\cos^2 \theta_r$ received from a square root forming stage Q for this sum signal. The stage Q, thus, is arranged to be in common for the two signal paths existing within the circuitry.

This servo circuitry is going to function in a perfect manner to achieve the purpose, but there exists the danger that either the mutual adaptation between the signals b1, b2 and a1, a2, which may be regarded as signal components during the power-up phase of the servo circuitry, is not good enough, so that the seat S might perform unintentional turning movements during the power-up phase, or that powerful eigen-oscillations may be generated whenever the seat is exposed to any external powerful influencing forces exerted on the seat or during the first power-up of the circuitry, or in the case that the circuit has been energized with an unduly low battery voltage or the like, when operating the wheeled chair and a fresh power-up is being tried under such conditions. On the other hand, experiments with the circuitry has shown that also in case that no unintended eigen-oscillations of the seat S result, then nevertheless, the motor supply current may be unduly augmented leading to a degrading of the performance of the chair, in particular when the drive means M is an electric motor.

According to the invention, a monitoring stage IM is inserted for the purpose to detect strong current increases to such a motor. If the current increases above a certain limit the monitoring stage activates the two change-over stages INIT1 and INIT2 which also are referred to as c1 and c2, so that the two signals a1 and a2 or signal components instead of the signals which arrive from the multiplying stages IM1 and IM2 which receive signal from the turning knob DS, are connected to the inputs on the operating running integrating stages IT1 and IT2 and also simultaneously are further connected to the running integrating stages IT1 and IT2 in such a manner that the output signals from these stages are made equal to the supplied input signals, in particular, for example, the signals d1 and d2, which in the drawing are referred to with the indicated references OUT=IN. In this manner, the output signals b1 and b2 issuing from the two paths through the circuitry are forced to attain such corresponding "sin" and "cos" values that the current of the seat drive means is regulated to zero value. As result of the change-over, the resulting "cos" and "sin" signals present on the inputs (+) and (−) on the multiplying stages IM1 and IM2 in the paths through the circuitry, the current to the motor continues to have a zero value if, after a changing back to again having the multiplying stages IM1 and IM2 operating, which thus is achieved by a changing back of the stages INIT1 and INIT2, also referred to as c1 and c2, the seat turning activating turning knob DS occupies the mid-position, or alternatively, it is safeguarded that the signals or signal components b1 and b2 are brought to running integrated "sin" and "cos" values which correspond in size "correctly" with the size of deflection that the seat turning activating turning knob DS occupies when being deflected away from its mid-position. In case an external mechanical force influence still is exerted on the seat or is brought to influence upon the seat, it is in this manner achieved that in case the motor current again attains too large a size, a self-correcting or self-compensating of the circuitry, as described above, is brought to operate by means of the described change-over facility.

If opposite, under very special circumstances, it should be desired that an extra forceful turning of the seat is to be performed using the drive means M, and in which case, a temporary overloading of the motor is accepted, it is proposed, as an option, that a separately activated, a timing device controlled element could be arranged to temporarily switch off the portion of the servo circuitry which is shown as the monitoring stage IM.

During power-up or when restarting the servo circuitry, the power-up devices, any restarting devices belonging to the circuitry, or some mechanical elements which belong to the servo mechanism, could be arranged to provide a corresponding change-over at the stages INIT1 and INIT2, also referred to as c1 and c2, to take place so that the current to the seat turning drive means M is maintained equal to zero during this particular phase of operation. When the power-up or re-starting procedure is finished, the running integrating stages INIT1 and INIT2, also referred to as c1 and c2, again should be arranged to be changed back to be put in operation together with the multiplying stages IM1 and IM2, and then, the seat turning activating turning knob DS is ready to be actively operated.

If it is desired that the seat S be completely free to be turned without any influence from the drive means M, such can be achieved by causing a change-over at the stages INIT1 and INIT2 to take place which produces a coupling condition just as the one produced when the servo circuitry is being powered-up.

Figure 2:
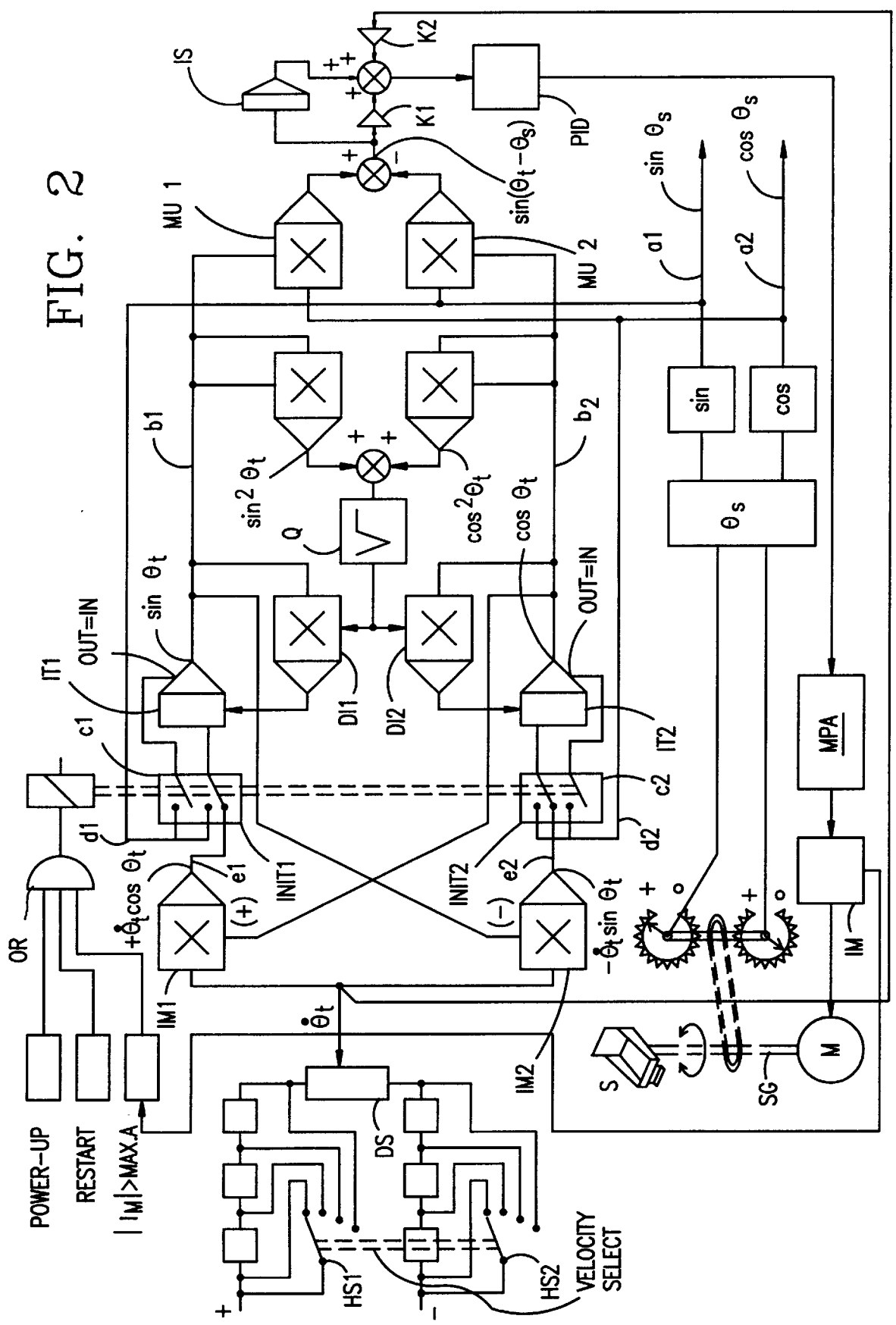
FIG. 2 shows further features which may be added to the servo illustrated through FIG. 1.

A corresponding embodiment is illustrated in FIG. 2 of the drawing. In this embodiment, per se known servo circuit elements IS, K1, K2 and PID are added, i.e. in the form of running integrating stages, of signal amplifying stages providing amplifyings K1 and K2 and of proportional-integrating-differentiating stages all being employed in per se known manner to causing the movements of the seat to take place in a comfortable manner.

The amplifying stage K2 serves to direct supply a contributing signal that is dependent on the velocity signal $\theta_r$ to the drive means control member MPA, to safeguard that the drive means motor M always, while driving, yields a certain minimum driving power.

A similar corresponding embodiment for providing an adaptation of the velocity to the movement to take place could also be added as a feature to the servo circuitry and thus serving, in the manner as achieved by means of the present servo circuitry, to control the supporting drive wheels of a wheel chair, such as in the case when the wheel chair is supported by several, in particular smaller and equally sized, supporting drive wheels, which wheels, for changing the orientation of driving, all are arranged to be steered equally and simultaneously. As aforementioned, a servo circuitry for such a wheel chair is disclosed in WO 93/20791. In this servo circuitry of the prior art, the steering of the drive wheels also is provided by means of a signal composed of "sin" and "cos" values and by which the size of the signal is made proportional to the desired steering speed. This signal of the prior art circuitry could easily be connected to the left hand side of the first multiplying stages IM1 and IM2, which are illustrated in FIG. 1 and 2 of the present drawing, and instead of these stages which in the drawing are shown connected for the control of a seat turning drive motor M, they would have to be connected to a servo motor of a position servo serving to steer the orientation of the drive wheels. In such case, it is not necessary to arrange such connections, as those described according to the prior art, serving to employ a difference providing stage used to provide the motor steering signal. Subsidiary, another type of easily contemplated connecting-together may be employed being better adapted to serve the steering purpose, such as to employ a multiplying feature with a multiplying factor equal to 2, etc.

According to FIG. 1 of the present drawing a selecting switch device employing four selectable maximum velocities is illustrated. As an alternative, a further steering could be employed, possibly being of a continuous nature, serving simultaneously with DS to determine the maximum velocity, but being made as a function of time, providing a change of velocity per unit of time of the positional signal arriving from the position angle encoder. In this manner, a controlling of the acceleration of the movement is achieved, so that this, when starting the turning, is high, and thereafter, changes so that further velocity changes take place with other rates of acceleration, respectively, deceleration rates being adapted in any equal manner. When a change-over to the operation of the self-correcting or self-compensating feature according to the invention takes place, it is simultaneously achieved that a total "first-beginning" takes place when a turning of the seat is provided by means of the drive means motor which thus is controlled by means of the self-correcting device according to the invention. This solution may be regarded as a very advantageous solution that is able to be achieved by means of the present invention.

It can be added, that one or more elements comprised within the self-correcting device featured according to the invention, in practice, can be provided by means of or be provided through elements which are based on microprocessor technics.

We claim:

1. Self correcting arrangement for self compensation of an operating position servo upon exertion of external forces on a movable object controlled by the servo and during a start-up phase of the position servo, the operating servo having a position encoder means for outputting position signal sets and means for turning of the movable object, the servo also having a servo circuitry with elements for simultaneously signal handling at least two sets of controlling positioning signals, each set having at least two positioning signals, wherein the servo circuitry comprises:

a. signal processing means for producing a first of said two sets of controlling positioning signals as at least two position signal components representing at least 2-dimensional positioning of the movable object, and for producing a second of said two sets of controlling positioning signals as at least two velocity dependent signal components corresponding to an aimed position of the object to be reached with an aimed velocity;

b. means for producing a drive powering signal as a function of the positioning signals received from said signal processing means; and d. a coupling device having at least two coupling members which are switchable between a first position which passes a respective one of the at least two velocity dependent signal components of the second set of controlling positioning signals to said means for producing the drive powering signal and a second position at least temporarily substituting a corresponding one of the at least two velocity dependent signal components of the second set of controlling position signals with a respective one of the at least two position signal components of the first set of controlling positioning signals and through this said second position of the coupling members to produce self compensation by at least temporarily producing a self-corrected value of the at least two velocity dependent signal components of the second set of controlling positioning signals, and causing the self-corrected value to be accepted as a new initial drive powering signal which is maintained as the drive powering signal by the servo when the coupling members are switched back and attain said first switching position.

2. Self correcting device according to claim 1, wherein said servo circuity includes means for producing the signal components of each of the at least two sets of controlling position signals as mutually conjugated signal components.

3. Self correcting device according to claim 1, wherein said means for producing said drive providing signal comprises difference signal building means for producing said drive powering signal for controlling a drive means of the position servo for the driving of the movable object, said difference signal building means having means for forming a difference signal representing the difference between outputs of multiplying stages, each of said multiplying stages being arranged in said circuitry so as to receive one of the said position signal components and one of said velocity dependent signal components as inputs.

4. Self correcting device according to claim 2, wherein said means for producing said drive providing signal comprises difference signal building means for producing said drive powering signal for controlling a drive means of the position servo for the driving of the movable object, said difference signal building means having means for forming a difference signal representing the difference between outputs of multiplying stages, each of said multiplying stages being arranged in said circuitry so as to receive one of the said position signal components and one of said velocity dependent signal components as inputs.

5. Self correcting device according to claim 4 wherein an amplifying stage is provided for supplying a contributing signal, that is dependent on a velocity signal to a drive means control member, to the difference signal for safeguarding the drive means while yielding a certain minimum driving power.

6. Self correcting device according to claim 3, wherein an amplifying stage is provided for supplying a contributing signal, that is dependent on a velocity signal to a drive means control member, to the difference signal for safeguarding the drive means while yielding a certain minimum driving power.

7. Self correcting device according to claim 3, wherein said difference signal building means further comprises an in time running integrating stage for running integration of the difference signal.

8. Self correcting device according to claim 4, wherein the said difference signal building means further comprises an in time running integrating stage for running integration of the difference signal.

9. Self correcting device according to claim 7, wherein the said difference signal building means further comprises an in time running integrating stage for running integration of the difference signal.

10. Self correcting device according to claim 5, wherein at least one operating amplifying stage is arranged in parallel with the in time running signal integrating stage; and wherein the at least one amplifying stage, the in time running signal integrating stage and the amplifying stage for supplying a contributing signal are connected through a signal adding means for adding outputs therefrom.

11. Self correcting device according to claim 7, wherein at least one operating amplifying stage is arranged in parallel with the in time running signal integrating stage; and wherein the at least one amplifying stage, the in time running signal integrating stage and the amplifying stage for supplying a contributing signal are connected through a signal adding means for adding outputs therefrom.

12. Self correcting device according to claim 8, wherein at least one operating amplifying stage is arranged in parallel with the in time running signal integrating stage; and wherein the at least one amplifying stage, the in time running signal integrating stage and the amplifying stage for supplying a contributing signal are connected through a signal adding means for adding outputs therefrom.

13. Self correcting device according to claim 9, wherein said movable object is a seat of a wheel chair.

* * * * *